(12) United States Patent
Slobodskyy

(10) Patent No.: US 10,735,375 B2
(45) Date of Patent: Aug. 4, 2020

(54) WEB APPLICATION SECURITY WITH SERVICE WORKER

(71) Applicant: SAP SE, Walldorf (DE)

(72) Inventor: Taras Slobodskyy, Hamburg (DE)

(73) Assignee: SAP SE, Walldorf (DE)

( * ) Notice: Subject to any disclaimer, the term of this patent is extended or adjusted under 35 U.S.C. 154(b) by 191 days.

(21) Appl. No.: 15/635,470

(22) Filed: Jun. 28, 2017

(65) Prior Publication Data
US 2019/0007373 A1    Jan. 3, 2019

(51) Int. Cl.
*H04L 29/06* (2006.01)
*H04L 29/08* (2006.01)

(52) U.S. Cl.
CPC ........ *H04L 63/0227* (2013.01); *H04L 63/101* (2013.01); *H04L 63/1408* (2013.01); *H04L 67/02* (2013.01); *H04L 67/10* (2013.01); *H04L 63/0245* (2013.01); *H04L 63/145* (2013.01)

(58) Field of Classification Search
CPC ............ H04L 63/0227; H04L 63/1408; H04L 63/101; H04L 67/02; H04L 67/10; H04L 63/145; H04L 63/0245
See application file for complete search history.

(56) References Cited

U.S. PATENT DOCUMENTS

| | | | |
|---|---|---|---|
| 8,065,410 B1* | 11/2011 | Breen | H04L 67/025 702/182 |
| 8,826,141 B2* | 9/2014 | Dimitrov | G06F 3/0481 715/738 |
| 9,936,041 B2* | 4/2018 | Childress | H04L 67/2842 |
| 2014/0188791 A1* | 7/2014 | Hahn | G06F 16/1734 707/610 |
| 2015/0170072 A1* | 6/2015 | Grant | G06Q 10/067 705/7.36 |
| 2016/0212012 A1* | 7/2016 | Young | H04L 41/14 |
| 2017/0006128 A1* | 1/2017 | Graham-Cumming | H04L 67/2842 |
| 2017/0310409 A1* | 10/2017 | Yamagishi | H04H 20/91 |
| 2017/0339138 A1* | 11/2017 | Lewison | H04L 9/3239 |

* cited by examiner

*Primary Examiner* — Don G Zhao
*Assistant Examiner* — Hany S. Gadalla
(74) *Attorney, Agent, or Firm* — Schwegman Lundberg & Woessner, P.A.

(57) ABSTRACT

Various examples are directed to systems and methods of executing a web application. A web browser application may receive web application code for executing the web application and service worker code for executing a service worker. The web browser may execute a first portion of the web application code to register the service worker and may execute the service worker. The web application may send a first communication request describing a first recipient computing device. The service worker may determine that the first communication request complies with set of filter rules and send the first communication request to the first recipient computing device.

20 Claims, 11 Drawing Sheets

WEB APPLICATION SECURITY WITH SERVICE WORKER

TECHNICAL FIELD

This document generally relates to methods and systems for use with computer devices, including networked computing devices. More particularly, this document relates to systems and methods for secure web application communications utilizing one or more service workers.

BACKGROUND

Web applications are typically executed in a web browser application to provide a user interface (UI) to a user. When executed, web applications are able to make communication requests directed to remote servers. For example, web applications may request UI content from a web server, send transaction information to a merchant server, etc.

BRIEF DESCRIPTION OF DRAWINGS

The present disclosure is illustrated by way of example, and not limitation, in the following figures.

DETAILED DESCRIPTION

Figure 1:
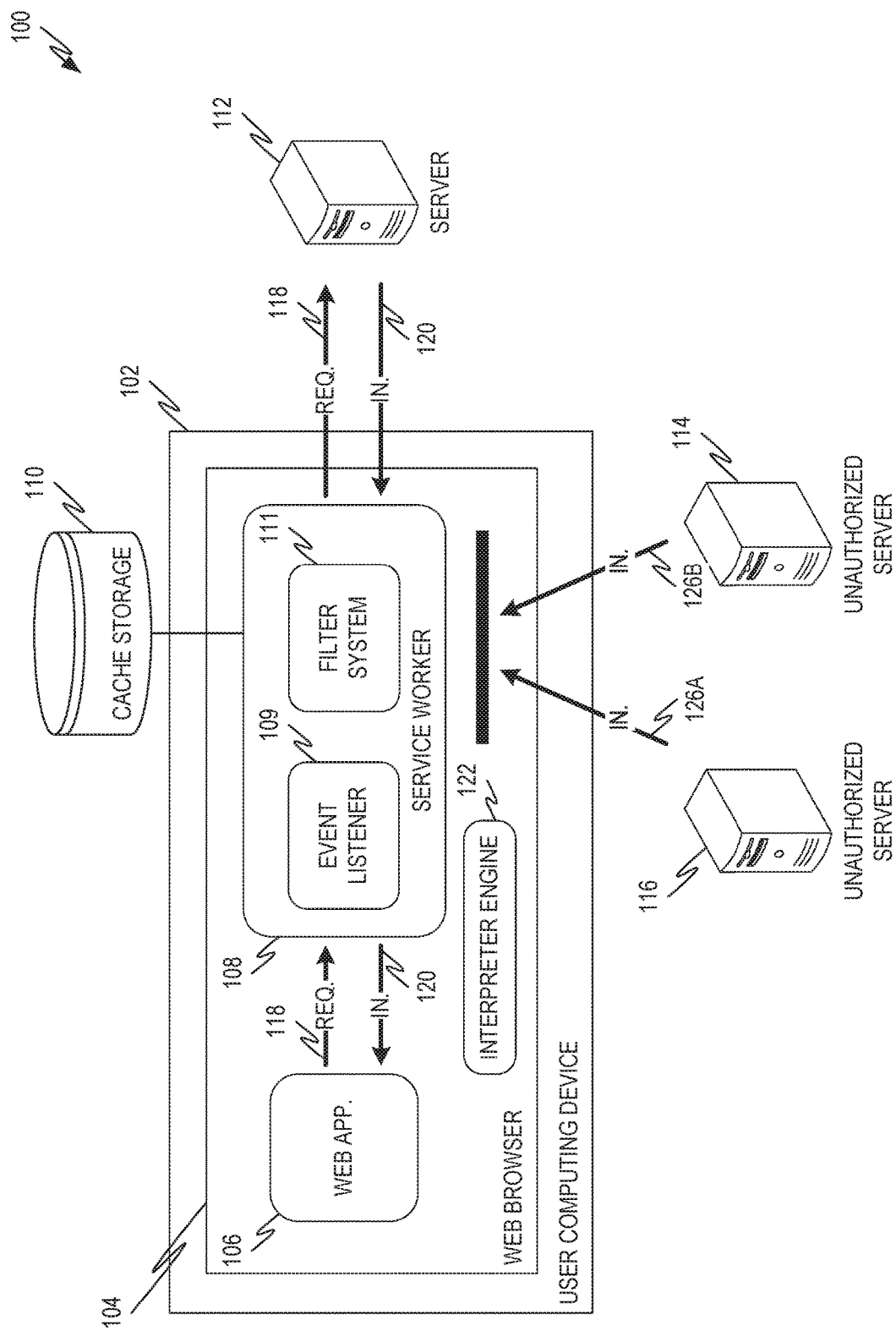
FIG. 1 is a diagram showing one example of an environment for implementing web application security with a service worker.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

The communication capabilities of a web application can be exploited by malicious code to attack a computing device. For example, malicious code can be incorporated into the web application to intercept sensitive information and send it to another computing device. For example, an e-commerce web application infected with malicious code of this type may send customer credit card data to an attacker computing device. In another type of attacks, malicious code incorporated into a web application requests and downloads other malicious code that executes at the computing device. Web application developers can take steps to keep malicious code out of their web applications; however, such techniques are not effective all the time. For example, scripts from content distribution networks may be compromised. Also, because web applications execute on the client side, the developer may not have direct control over the execution environment.

Various examples are directed to systems and methods that utilize service workers to reduce the vulnerability of web applications to malicious code. A service worker may be executed in a web browser to control one or more web applications also executed in the web browser. The service worker may be configured to process outgoing communication requests made by the controlled web application or applications. For example, when the web application makes an outgoing communication request, the web browser may direct the communication request to the service worker, where a fetch event is initiated. The fetch event may include the communication request object. The service worker may act on the fetch event, for example, by sending the communication request to the recipient computing device, responding to the communication request from locally cached data, denying the outgoing communication request, and/or performing another suitable operation.

In various examples, the service worker is programmed to filter communication requests to identify and block unintended communication requests. For example, the service worker may be programmed to respond to a fetch event by applying a set of one or more filter rules to the corresponding communication request. The filter rules may be selected to identify unintended communication requests. Unintended communication requests include communication requests by a web application that are not in accordance with the ordinary functioning of the web application. For example, an unintended communication request may be directed to an unauthorized (and potentially malicious) recipient, made at an unintended time, made outside of an intended sequence of communications, etc. The service worker may block unintended communication requests. Communication requests that comply with the set of filter rules may be referred to as intended communication requests. The service worker may respond to intended communication requests, for example, by forwarding them to the recipient computing device, responding from cached content, etc.

In some examples, the service worker also filters incoming communications directed to controlled web applications. For example, an incoming communication is compared to a set of one or more filter rules. If the incoming communication complies with the filter rules, then the incoming communication may be classified as intended and the service worker may process the incoming communication, for example, by forwarding the incoming communication to the recipient web application, generating a push event for the web application, etc.

In some examples, a service worker configured as described herein intercepts and rejects any communication requests that are made by malicious code that has been incorporated into the web application. For example, even in situations where malicious code is present in a web application, attempted attacks may be thwarted by rejecting communication requests made by the malicious code. For example, malicious code that skims confidential information may be prevented from sending that confidential information to a third-party computing device for use. Also, malicious code that downloads other malicious code may be prevented from requesting the download.

In some examples, the web application may be programmed to make it difficult for any malicious code that may be present to modify or bypass the service worker by obscuring the service worker for the web application. For example, at or near the time that the web application registers the service worker, it may overwrite a controller variable that references the service worker. This may prevent or make it more difficult for malicious code to access and/or modify the service worker after it has been registered.

FIG. 1 is a diagram showing one example of an environment 100 for implementing web application security with a service worker 108. The environment 100 includes a user computing device 102 that is in communication with various servers 112, 114, 116. The user computing device 102 may be or include any suitable computing device, such as, for example, a desktop computer, a laptop computer, a tablet computer, a mobile phone, etc. Similarly, the servers 112, 114, 116 may be or include any suitable computing devices. Examples of hardware and software arrangements for computing devices that may make up all or part of the user computing device 102 and/or various servers 112, 114, 116 are provided herein with reference to FIGS. 10 and 11 described blow.

The user computing device 102 executes a web browser 104. The web browser 104 may be or include any suitable web browser including, for example, the Chrome® browser available from Google Inc., the Firefox® browser available from Mozilla Foundation, the Safari® browser available from Apple Inc., the Internet Explorer® browser available from Microsoft Corporation, the Microsoft Edge® browser available from Microsoft Corporation.

The user computing device 102 may execute the web application 106 and/or the service worker 108 in the web browser 104. For example, the web browser 104 may include an interpreter engine 122, such as a JavaScript engine or other suitable interpreter engines. The interpreter engine 122 may receive and execute interpreted code, such as web application code for executing the web application 106 and service worker code for executing the service worker 108.

In some examples, a user of the user computing device 102 accesses the web application 106 by launching the web browser 104 and selecting a Universal Resource Locator (URL) or other address associated with the server 112. The web browser 104 may send to the server 112 a request for the web application 106 and receive, in reply, the web application code. The web application code may be in any suitable form. In some examples, the web application code is in an interpreted language, such as Hypertext Transfer Protocol (HTTP), JavaScript, etc. In some examples, the web application code includes or is accompanied by other content such as text content, media content, etc., that may be provided as part of a UI provided by the web application 106 through the web browser 104. The web browser 104 may also request and receive service worker code for executing the service worker 108. The service worker code, in some examples, is also in an interpreted language such as HTTP, JavaScript, etc. Service worker code may be received from the server 112 and/or another server. In some examples, the service worker code is included with the web application code.

The web browser 104 executes the web application 106, for example, utilizing the interpreter engine 122. Upon execution, the web application 106 may register and/or launch the service worker 108. The service worker 108 may be configured to receive some or all communication requests directed to the web application 106 and/or incoming communications directed to the web application 106. For example, the web browser 104 and service worker 108, in some examples, are configured according to the guidelines set forth in Service Workers 1. W3C Working Draft from the World Wide Web Consortium (W3C). As shown, the service worker 108 may include one or more event listeners 109 and a filter system 111. The event listener 109 may subscribe to events generated by the web browser 104 and/or the web application 106. The filter system 111 may apply a set of one or more filter rules to communication requests from the web application 106, such as communication request 118, and/or to incoming communications directed to the web application 106, such as the incoming communication 120. The filter system 111 may reject unintended communication requests and/or unintended incoming communications, as described herein.

FIG. 1 shows several example communications that may be considered by the filter system 111, including an example communication request 118 sent by the web application 106. The communication request 118 may indicate a recipient computing device to which the communication request 118 is directed. For example, the communication request 118 may include a URL, Internet Protocol (IP) address, or other indication of the recipient computing device. The communication request 118 may also include message content that may include text and/or other data.

The web browser 104 may detect the communication request 118 and generate a fetch event, which is received by the event listener 109 of the service worker 108. In response to the fetch event, the service worker 108 (e.g., the filter system 111 thereof) may evaluate the communication request 118 against the set of one or more filter rules to determine if the communication request 118 is unintended. In the example of FIG. 1, the recipient computing device is the server 112 and the communication request 118 complies with the set of filter rules. Accordingly, the service worker 108 forwards the communication request 118 to the recipient computing device, which in this example is the server 112.

FIG. 1 also shows an incoming communication 120 that originates from the server 112. The incoming communication 120 may be directed to the user computing device 102, for example, directly to the web browser 104. In response to the incoming communication 120, the web browser 104 may generate a fetch request that is received by the event listener 109. In response to the fetch request, the service worker 108 (e.g., the filter system 111 thereof) applies a set of filter rules to the incoming communication 120 to determine if the incoming communication 120 is unintended. The set of filter rules applied to the incoming communication 120 may be the same set of filter rules applied to communication requests from the web application 106 (e.g., communication request 118) and/or a different set of filter rules. In the example of FIG. 1, the incoming communication 120 complies with the applied set of filter rules and is, therefore, classified as intended. The service worker 108 forwards the incoming communication 120 to the web application 106.

FIG. 1 also shows incoming communications 126A, 126B that originate from unauthorized servers 114, 116. These incoming communications 126A. 126B, may not comply with the set of filter rules and, therefore, may not be forwarded to the web application 106. Incoming communications 120, 126A, 126B may be, for example, relies to requests made by the web application 106, push notifications initiated by the respective servers 112, 114, 116, or any other suitable communications.

In some examples, the service worker 108 may perform other operations in addition to filtering communication requests and incoming communications for the web application 106. For example, the service worker 108 may cache web application content. Web application content may include UI content or other content utilized by the web application 106. UI content that may be cached may include, for example, text documents, media files such as pictures, videos, etc. The service worker 108 may be in communication with a cache storage 110 of the user computing device 102 to store and retrieve cached UI content. Also, in some examples, the service worker 108 may generate push events in response to an incoming communication, such as the incoming communication 120. A push event may prompt the web application 106 to take an action such as, for example, prompt a user, display an indication that the push event has been received, etc.

Figure 2:
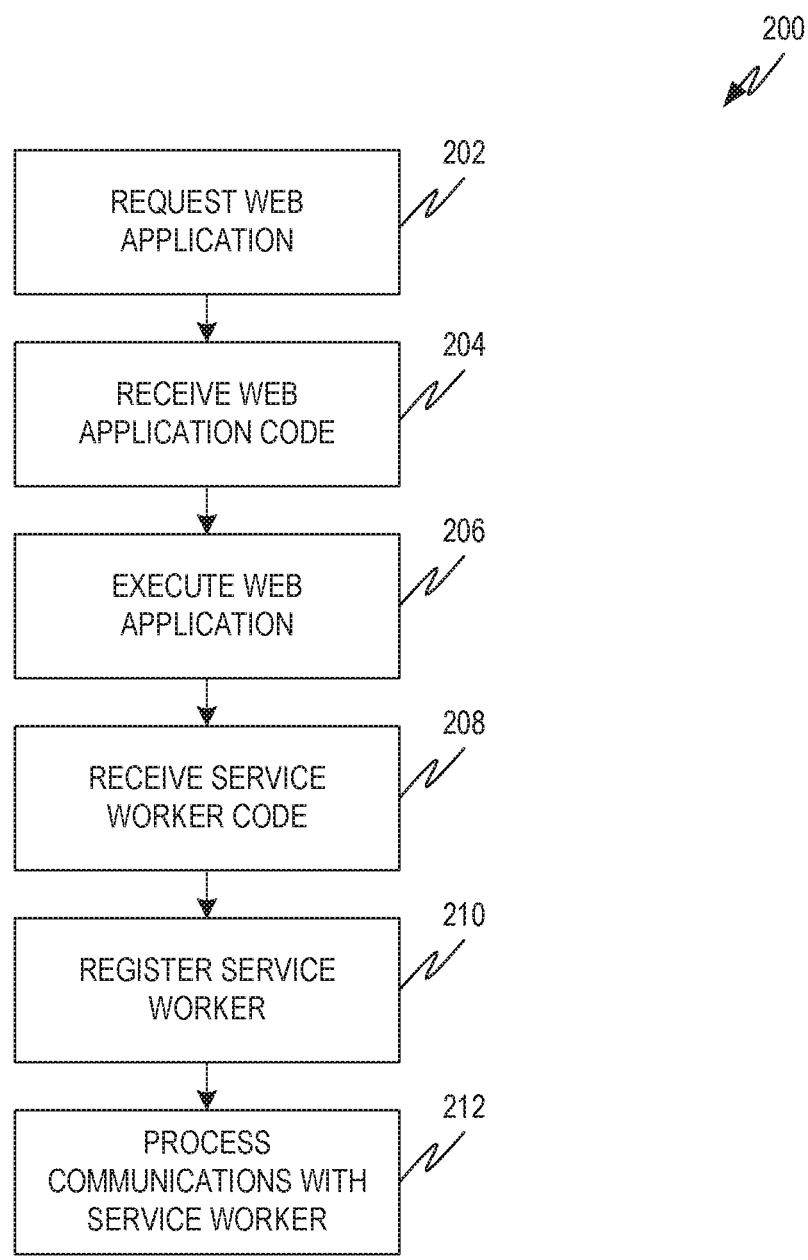
FIG. 2 is a flowchart showing one example of a process flow that may be executed by the web browser to initialize a web application and service worker as shown in the environment of FIG. 1.

FIG. 2 is a flowchart showing one example of a process flow 200 that may be executed by the web browser 104 to set up a web application 106 and service worker 108 as shown in the environment 100 of FIG. 1. At operation 202, the web browser 104 may request the web application 106 from the server 112. The request for the web application 106 may be in response to a user of the user computing device 102 providing a URL or other address that identifies the web application 106 and/or a web page associated with the web application 106. The request may be sent to the server 112. The server 112 may reply to the request by providing web application code to the web browser. The web application may include code expressed in an interpreted language, such as JavaScript, that may be executed by a JavaScript engine or other interpreter included in the web browser 104. In some examples, the web application code includes or is accompanied by other content such as text content, media content, etc., that may be provided as part of a UI provided by the web application 106 through the web browser 104. At operation 204, the web browser 104 may receive the web application code for executing the web application 106 from the server 112.

The web browser 104 may execute the web application 106 at operation 206. For example, the interpreter engine 122 of the web browser 104 may receive and execute the web application code. At operation 208, the web browser 104 may receive service worker code for executing the service worker. Although operation 208 is positioned after operations 204 and 206 in the process flow 200, the service worker code may be received at any suitable time. In some examples, the service worker code is received from the server 112 at the same time as the web application code. In some examples, the service worker code is received from the server 112 when after the web application 106 begins executing. For example, the web application code may include instructions for requesting the service worker code.

Also, as described herein, the service worker code may be received from the server 112 that provided the web application code and/or from a different remote computing device.

At operation 210, the web application 106 may register the service worker 108. Registering the service worker 108 may include initiating execution of the service worker code and/or defining a scope of communications that will be handled by the service worker. At operation 212, the web browser 104, web application 106, and service worker 108 may process communication requests and incoming communications utilizing the service worker 108 as described herein. For example, the service worker 108 may evaluate communication requests from the web application 106 and/ or incoming communications to the web application 106 for compliance with one or more sets of filter rules.

Figure 3:
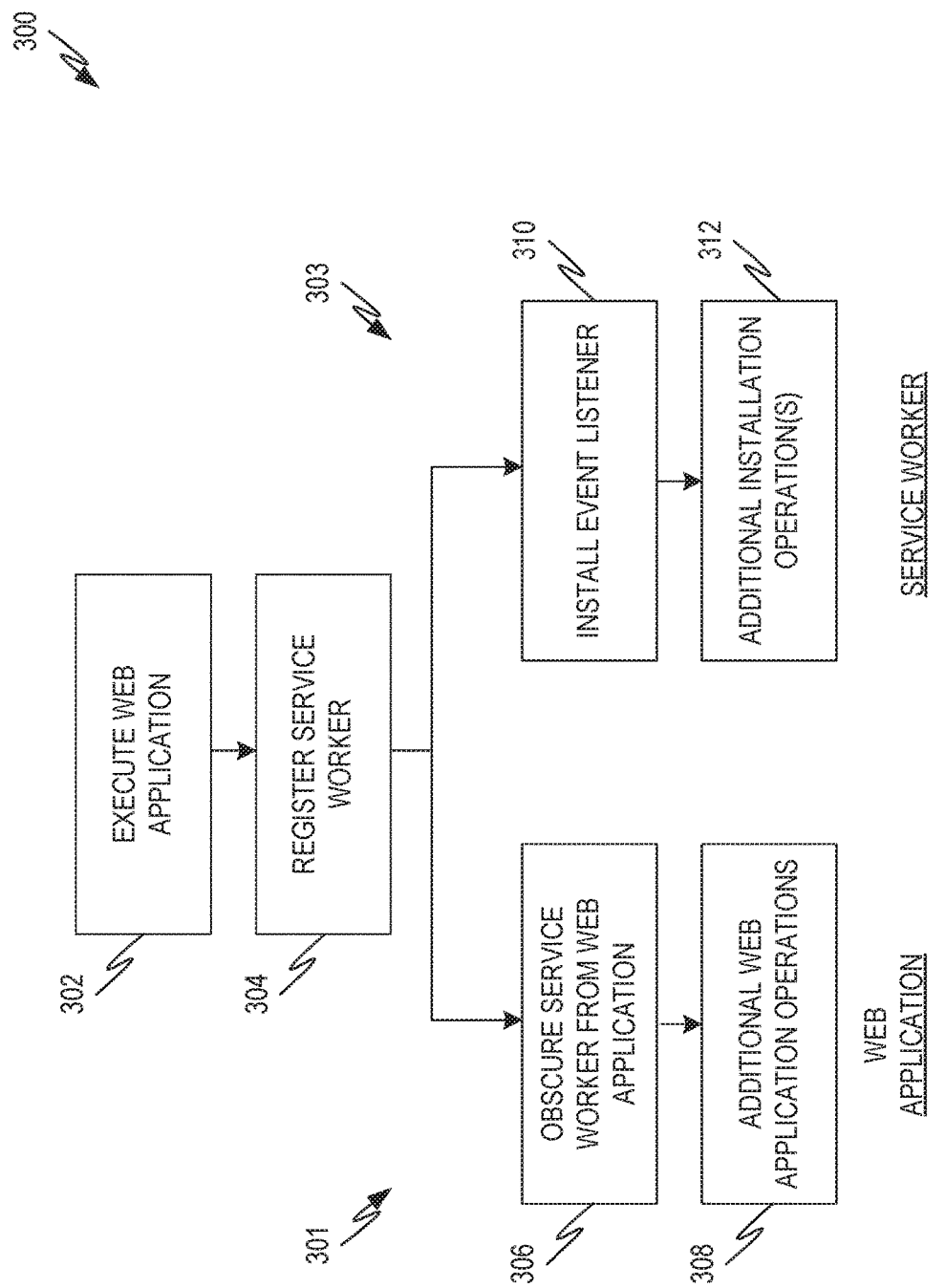
FIG. 3 is a flowchart showing another example of a process flow that may be executed by the web browser to execute the web application with the service worker.

FIG. 3 is a flowchart showing another example of a process flow 300 that may be executed by the web browser 104 to execute the web application 106 with the service worker 108. The process flow 300 shows an example division of operations between the web browser 104 and the components being executed by the web browser 104 (e.g., the web application 106 and the service worker 108. At operation 302, the web browser 104 may execute the web application 106, for example, utilizing the web application code and the interpreter engine 122.

The remaining operations described in the process flow 300 may be described as being performed by the web application 106 and/or by the service worker 108. Column 301 includes operations that are performed by the web application 106 and column 303 includes operations that are performed by the service worker 108. In some examples, the operations of FIG. 3 may be performed by different actors. For example, the registration of the service worker (operation 304) may be performed by the web application 106.

At operation 304, the web browser 104 may register the service worker 108. Registering the service worker 108 may include, for example indicating a location of the service worker code to be executed. In some examples, registering the service worker 108 also includes specifying a scope of the service worker 108. The scope of the service worker 108 indicates the web application 106 or web applications that are controlled by the service worker 108. For example, the web browser 104 may forward communications from or directed to controlled web applications to the service worker 108. The service worker 108 may be configured to process the communications or block them as described herein. Example JavaScript code for registering the service worker 108 is provided below:

navigator.serviceWorker.register('/sw.js', {scope: '/'});

In this example code, the service worker code is called "sw.js" and is located at a root directory. The scope of the service worker 108 is set to a root directory, indicating that the service worker 108 is to control all content which was downloaded from the server 112 (e.g., identified by a URL or other domain name). Although one web application 106 is shown in FIG. 1, the service worker 108, in some examples, controls multiple web applications within its scope, e.g., if multiple web applications were downloaded from the initial URL.

At optional operation 306, the web application 106 and/or web browser 104 may obscure the service worker 108 from the web application 106. For example, if malicious code is incorporated into the web application 106, that malicious code may include instructions for disabling or otherwise defeating the service worker 108 to enable illicit communications. Obscuring the service worker 108 from the web application 106 may prevent the web application 106 from referencing the service worker 108. This may make it more difficult for any malicious code that is incorporated into the web application 106 to disable or otherwise defeat the service worker 108.

In some examples, the service worker 108 is obscured by overwriting a pointer or other variable that allows manipulation of the service worker 108 (e.g., a reference to a service worker interface). For example, the web application 106 may include code that overwrites a reference to the service worker interface, which may disable the possibility of further manipulation of the service worker 108 by the web application 106. Example code that may be included in the web application 106 to obscure the service worker 108 is provided below:

navigator.serviceWorker.controller=undefined;

In some examples, the web browser 104 may be configured to prevent web applications 106 from referencing the service worker 108 after it is initialized, which may make it unnecessary for the web application 106 to specifically obscure the service worker 108.

At operation 308, the web application 106 may perform additional web application operations. Additional operations may be selected, for example, to implement a functionality of the web application 106. In some examples, the web application 106 is configured to display content to a user of the computing device 102 via a UI. In some examples, the web application 106 is configured to provide access to a database and/or application hosted by the server 112. In some examples, code for registering and/or obscuring the service worker 108 may be positioned within the web application 106 to execute before other operations of the web application 106, such as, for example, before the web application 106 loads libraries, UI resources, or other data.

In one example implementation, the web browser 104 downloads the web application code and service worker code. The web application code, executed as the web application 106, installs the service worker 108 and verifies that the service worker 108 was properly loaded. After this, the web application 106 loads the rest of the internal and/or external resources for execution. In this example implementation, obscuring of the service worker 108 may occur after the service worker is installed and before additional resources are loaded.

After the service worker 108 is registered, it may install an event listener, such as event listener 109 at operation 310. Event listeners may generate events in response to external stimuli. For example, a fetch event listener may generate a fetch event in response to a communication request from the web application 106 and/or an incoming communication directed to the web application 106. At operation 312, the service worker 108 may perform additional installation operations such as, for example, installing additional event listeners. Additional event listeners, for example, may generate install events in installation, generate push events upon the receipt of a request to generate a push message for the web application 106, etc.

Figure 4:
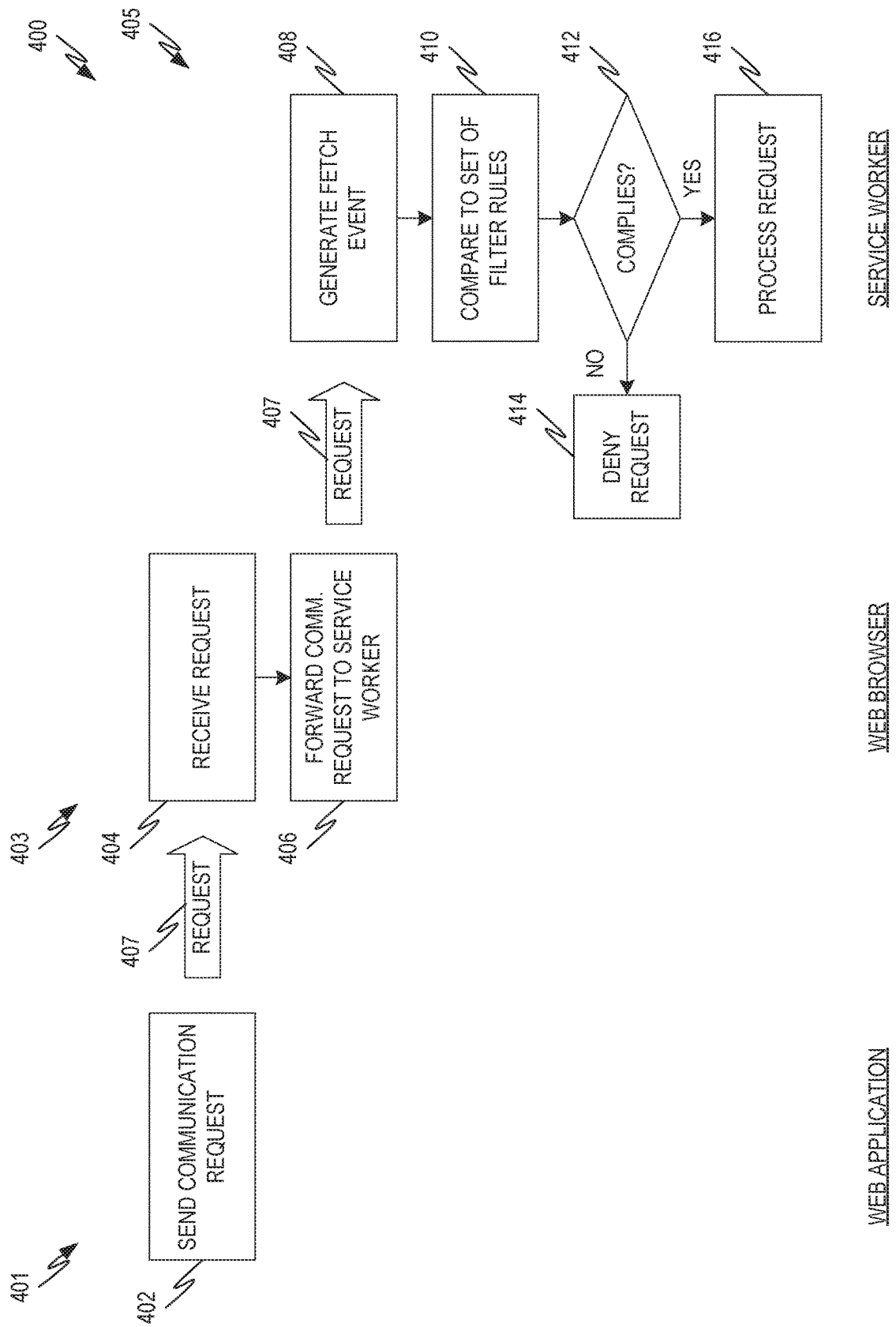
FIG. 4 is a flowchart showing one example of a process flow that illustrates the handling of a communication request from the web application in the environment of FIG. 1.

FIG. 4 is a flowchart showing one example of a process flow 400 that illustrates the handling of a communication request from the web application 106 in the environment 100 of FIG. 1. The process flow 400 includes three columns 401, 403, 405. Column 401 includes operations that may be performed by the web application 106. Column 405 includes operations that may be performed by the service worker 108. Column 403 includes operations that may be performed by the web browser 104.

At operation 402, the web application 106 sends a communication request 407, which may be similar to the communication request 118 shown in FIG. 1. The communication request 407 may describe a recipient computing device that is to receive the communication request 407. For example, the recipient computing device may be one of the servers 112, 114, 116. The web browser 104 may receive the communication request 407. The web browser 104 may receive the communication request 407 at operation 404. In response to the communication request 407, the web browser 104, at operation 406, may forward the communication request 407 to the service worker 108. For example, the web browser 104 may determine that the web application 106 is controlled by the service worker 108 and may, therefore, send the communication request 407 to the service worker 108 instead of sending it directly to the recipient computing device.

The service worker 108 may, at operation 408, generate a fetch event. The fetch event may include, for example, a request object that includes information about the communication request such as, for example, a URL or other indication of the recipient computing device. At operation 410, the service worker 108 may compare the communication request (e.g., or the request object) to a set of filter rules. Any suitable filter rules may be used. In some examples, a set of filter rules may include a whitelist rule. A communication request may comply with a whitelist rule if the recipient computing device is described by whitelist data including a list of recipient computing devices to which the web application 106 is permitted to send communication requests. Example code for implementing a filter rule including a whitelist rule is provided below:

```
var host =
event.request.url.split("//")[1].split("/")[0]
.split(":")[0];
if (Whitelist.indexOf(host) === -1{
    event.respondWith( new self.Response('// Not
permitted!') );
}
```

Other types of filter rules may be applied in addition to or instead of a whitelist rule. Another example of a type of filter rule is a blacklist rule. A communication request may comply with a blacklist rule if the recipient computing device is not described by blacklist data including a list of recipient computing devices to which the web application 106 is not permitted to send communication requests.

Another example of a type of filter rule is a time gate rule. A communication request may comply with a time gate rule if it is received/requested at an intended time. Consider an example where it is known that JavaScript libraries are to be loaded from a content distribution network in the first second of a page load and that no further libraries are loaded after that. A time gate rule may permit communication requests with content distribution hosts for the first second after the page load and block communication requests with content distribution hosts after the first second from page load. Another example of a time gate rule may permit communication requests with a particular recipient computing device at one time of the day and block them at another time of day.

Yet another example of a filter rule is a sequential filter rule. A communication request may comply with a sequential filter rule if it is received in a defined sequence relative to other communication requests. In an example, it may be known that the core library of the UI is always loaded first and that fonts are loaded later (e.g., the fonts may be initiated from the core library). A communication request may fail to comply with a sequential filter rule if it is directed to the recipient computing device including fonts and is received before a communication request to the recipient computing device including the core library was sent.

An additional example of a filter rule is a request counting rule. A communication request may comply with a request counting rule if there have been fewer than a threshold number of communication requests sent from the web application 106 to the recipient computing device. For example, if it is known that a web application uses three libraries to properly operate, a request counting rule may permit three successful communication requests to the recipient computing device and then block further communication requests to the recipient computing device.

At operation 412, the service worker 108 may determine if the communication request 407 complies with the set of one or more filter rules. If the communication request 407 does not comply with the set of filter rules, the service worker 108 may deny the request at operation 414. Denying the request, in some examples, includes sending to the web application 106 a denial message indicating that the request was denied.

If the communication request 407 does comply with the set of filter rules, then the service worker 108 may process the communication request 407 at operation 416. Any suitable processing may occur. For example, if content requested from the recipient computing device has previously been cached, the service worker 108 may generate a reply to the communication request 407 including cached content and provide the reply to the web application 106. If the content requested from the recipient computing device has not been cached, then the service worker 108 may send the communication request to the recipient computing device (e.g., the server 112).

Figure 5:
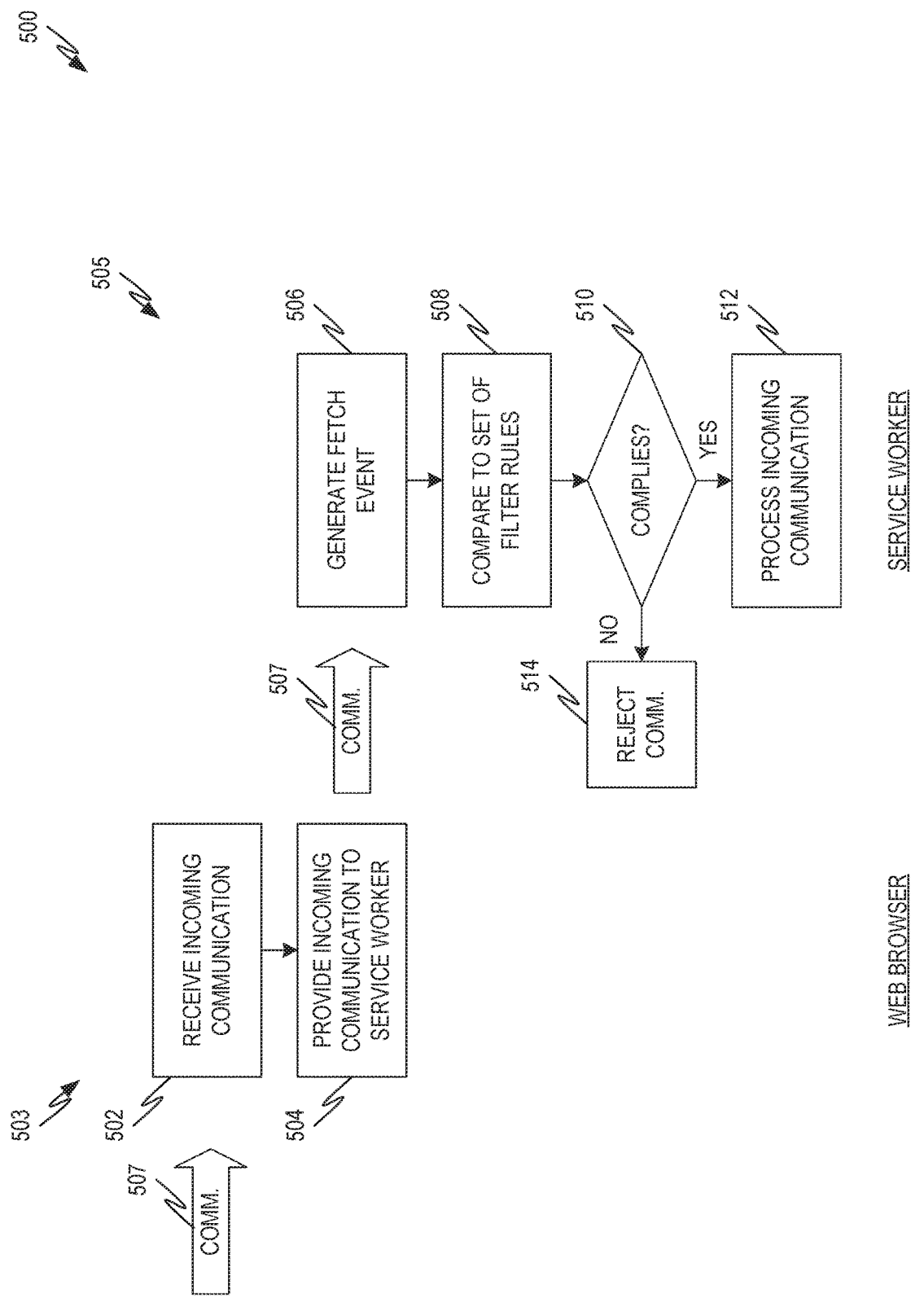
FIG. 5 is a flowchart showing one example of a process flow that illustrates the handling of an incoming communication from a computing device and directed to the web application in the environment of FIG. 1.

FIG. 5 is a flowchart showing one example of a process flow 500 that illustrates the handling of an incoming communication from a computing device and directed to the web application 106 in the environment of FIG. 1. The process flow 500 includes a column 503 showing operations that may be executed by the web browser 104 and a column 505 showing operations that may be executed by the service worker 108.

At operation 502, the web browser 104 may receive an incoming communication 507 from a remote computing device. The incoming communication 507 may be a reply to a communication request sent by the web application 106, for example, as described with respect to the process flow 400. In some examples, the incoming communication 507 is similar to the incoming communications 120, 126A, 126B described with respect to FIG. 1. At operation 504, the web browser 104 may send the incoming communication 507 to the service worker 108. For example, the web browser 104 may determine that the incoming communication 507 is directed to a web application (e.g., web application 106) that is controlled by the service worker 108.

In response to receiving the incoming communication 507, the service worker 108 may generate a fetch event at operation 506. The fetch event may include an object including data describing the incoming communication 507. At operation 508, the service worker 108 may compare the incoming communication 507 and/or the generated object to a set of one or more filter rules. Filter rules applied at operation 508 may be similar to those applied to the outgoing communication request at operation 410. For example, the set of filter rules may include one or more whitelist filter rules, blacklist filter rules, time gate filter rules, sequential filter rules, and/or request counting rules.

If the incoming communication 507 fails to comply with the set of one or more filter rules at operation 510, then the service worker 108 may reject the incoming communication 507 at operation 514. Rejecting the incoming communication 507 may include taking no further action on it. If the incoming communication 507 complies with the set of one or more filtering rules, the service worker 108 may process the incoming communication 507 at operation 512. Processing the incoming communication 507 may include, for example, sending the incoming communication 507 to the recipient web application, sending a push notification to the recipient web application, etc.

Figure 6:
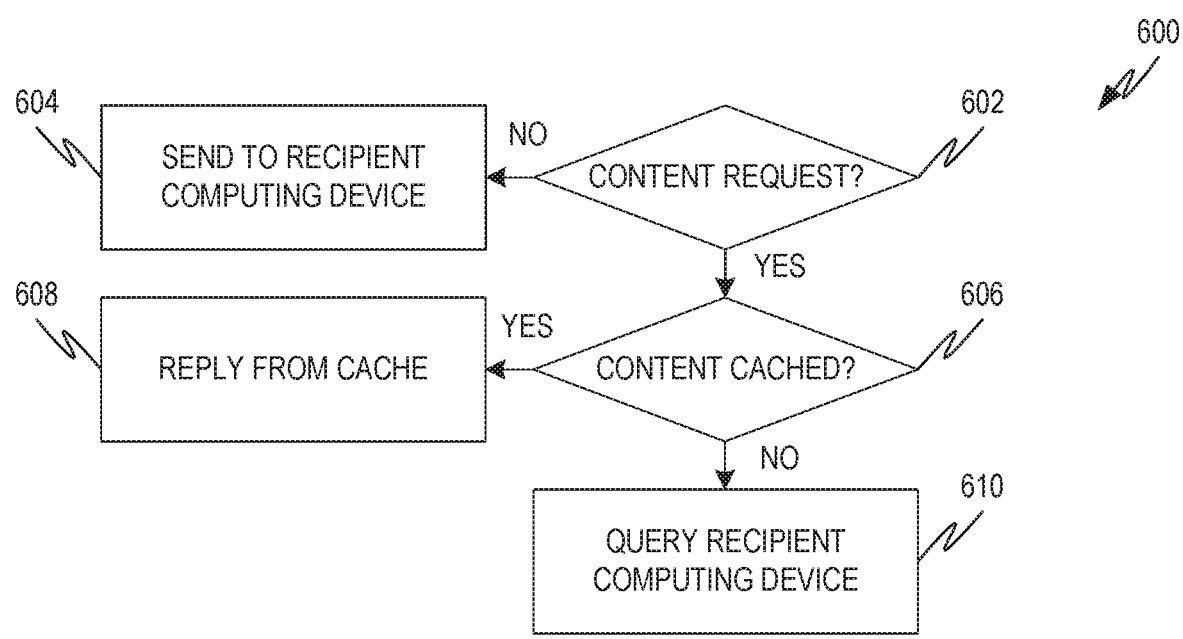
FIG. 6 is a flowchart showing one example of a process flow that may be executed by the service worker of FIG. 1 to process a communication request that complies with the set of one or more filter rules in an example where the service worker also applies caching.

FIG. 6 is a flowchart showing one example of a process flow 600 that may be executed by the service worker 108 of FIG. 1 to process a communication request that complies with the set of one or more filter rules in an example where the service worker 108 also applies caching. At operation 602, the service worker 108 may determine if the communication request includes a request for content (e.g., libraries, etc.) from the recipient computing device. If not, the service worker 108 may send the communication request to the recipient computing device at operation 604.

If the communication request does include a request for content at operation 602, the service worker 108 may determine at operation 606 whether the requested content is cached. If the requested content is cached, then the service worker 108 may reply to the web application 106 with the requested content from the cache storage at operation 608. If the requested content is not cached, then service worker 108 may send the communication request to the recipient computing device at operation 610. The recipient computing device may reply by providing an incoming communication including the requested content. The incoming communication may be processed, for example, as described herein with respect to the process flow 500 of FIG. 5.

Figure 7:
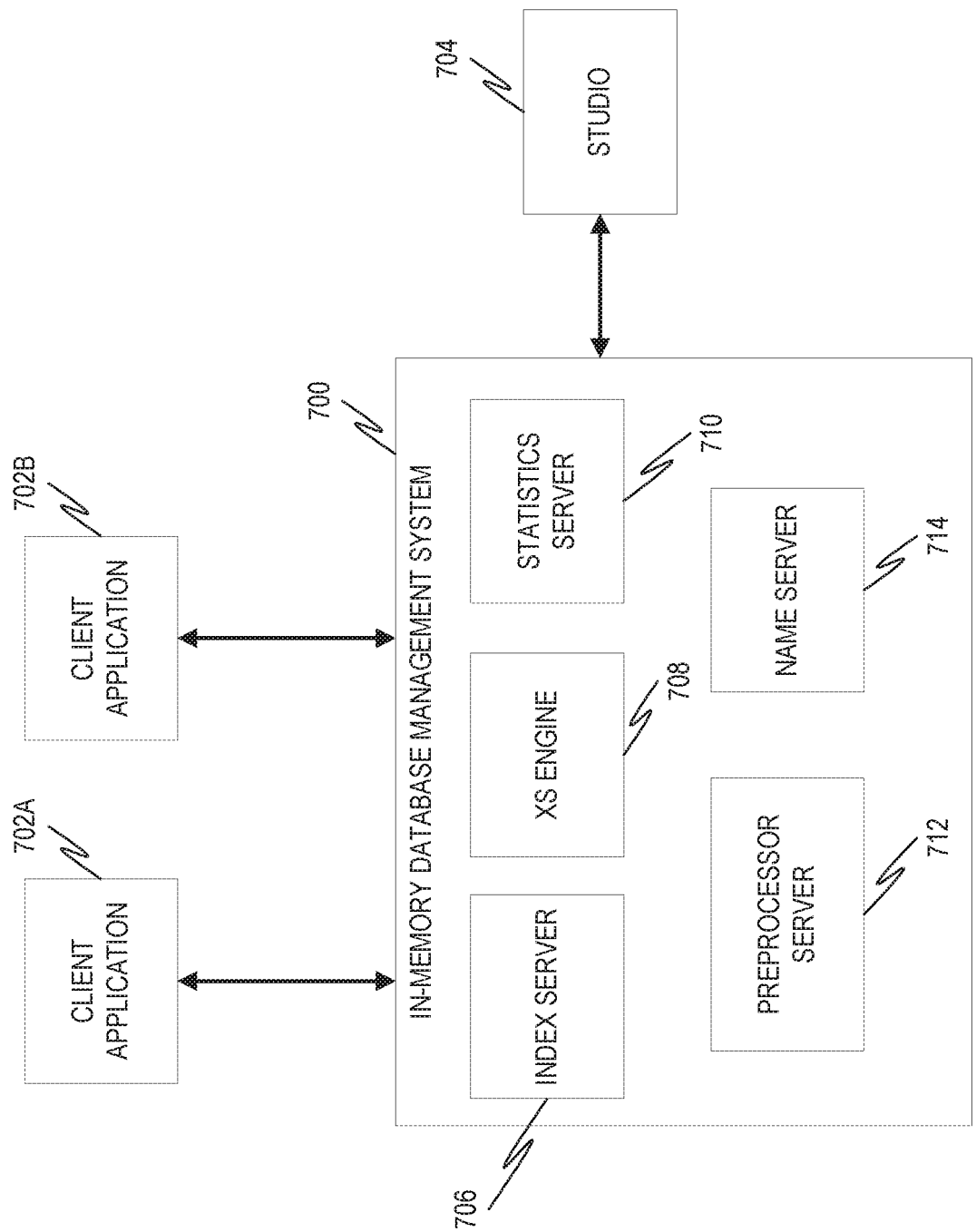
FIG. 7 is a diagram illustrating an example of an in-memory database management system that may be used to implement a web application in some examples of the network virtualization systems and methods described herein.

FIG. 7 is a diagram illustrating an example of an in-memory database management system 700 that may be used to implement a web application as described here. For example, whereas FIGS. 1-6 describe operations of a web application on the client side. FIG. 7 shows one example implementation with additional details of the server side.

An in-memory database stores data primarily at a main memory, such as a random access memory (RAM). This is different than databases that primarily employ a disk storage mechanism. In some examples, the database management system 700 may be or include an example of the HANA system from SAP SE of Walldorf, Germany. Although various features of web applications are described herein in the context of an in-memory database, web application security with service workers, as described herein, may be generally implemented for any type of web application.

The in-memory database management system 700 may be coupled to one or more client applications 702A, 702B. For example, client applications 702A, 702B may be examples of the web application 106 or other web applications controlled by one or more service workers as described herein. Client applications 702A, 702B may execute one or more queries utilizing data from the database including, for example, presenting a user interface (UI) to one or more users, entering data, accessing data, etc. The client applications 702A, 702B may communicate with the in-memory database management system 700 through a number of different protocols, including Structured Query Language (SQL), Multidimensional Expressions (MDX), Hypertext Transfer Protocol (HTTP). Representational State Transfer (REST), Hypertext Markup Language (HTML).

FIG. 7 also shows a studio 704 that may be used to perform modeling by accessing the in-memory database management system 700. In some examples, the studio 704 may allow complex analysis to be performed on data drawn not only from real-time event data and windows, but also from stored database information.

The in-memory database management system 700 may comprise a number of different components, including an index server 706, an XS engine 708, a statistics server 710, a preprocessor server 712, and a name server 714. These components may operate on a single computing device, or may be spread among multiple computing devices (e.g., separate servers). The index server 706 contains the actual data and the engines for processing the data. It may also coordinate and uses the other servers.

The XS engine 708 allows clients to connect to the in-memory database management system 700 using web protocols, such as Hypertext Transfer Protocol (HTTP). Although the XS engine 708 is illustrated as a component of the in-memory database management system 700, in some examples, the XS engine 708 may be implemented as one or more Application Program Interfaces (APIs) and/or services positioned between the client applications 702A, 702B and the in-memory database management system 700. For example, the XS engine 708 may be configured to process client requests received in languages other than SQL such as, for example, Multidimensional Expressions (MDX), Hypertext Transfer Protocol (HTTP), Representational State Transfer (REST), Hypertext Markup Language (HTML), etc.

The statistics server 710 collects information about status, performance, and resource consumption from all the other server components. The statistics server 710 can be accessed from the studio 704 to obtain the status of various alert monitors.

The preprocessor server 712 is used for analyzing text data and extracting the information on which the text search capabilities are based.

The name server 714 holds information about the database topology. This is used in a distributed system with instances of the database on different hosts. The name server 714 knows where the components are running and which data is located on which server. In an example embodiment, a separate enqueue server may operate in the manner described above with respect to enqueue servers, specifically with regard to creating and managing light-weight enqueue sessions.

Figure 8:
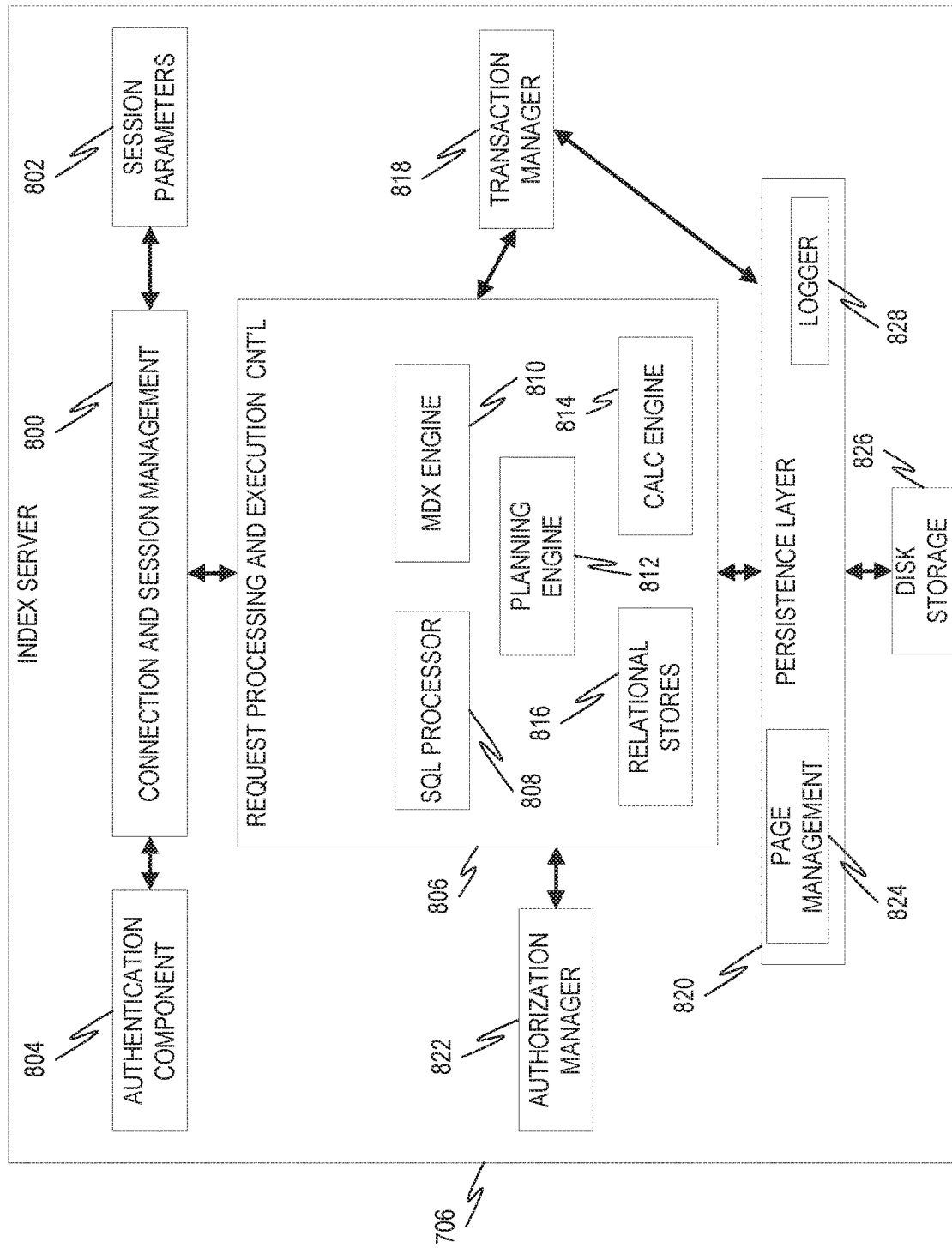
FIG. 8 is a diagram illustrating an example of the index server of FIG. 7.

FIG. 8 is a diagram illustrating an example of the index server 706. Specifically, the index server 706 of FIG. 7 is depicted in more detail. The index server 706 includes a connection and session management component 800, which is responsible for creating and managing sessions and connections for the database clients (e.g., client applications 702A, 702B). Once a session is established, clients can communicate with the database management system 700 using SQL statements. For each session, a set of session parameters 802 may be maintained, such as auto-commit, current transaction isolation level, etc. Users (e.g., system administrators, developers) may be authenticated by the database management system 700 itself (e.g., by logging in with log-in information such as a user name and password, using an authentication component 804), or authentication can be delegated to an external authentication provider such as a Lightweight Directory Access Protocol (LDAP) directory.

Client queries can be analyzed and executed by a set of components summarized as request processing and execution control 806. An SQL processor 808 checks the syntax and semantics of the client SQL statements and generates a logical execution plan. Multidimensional expressions (MDX) is a language for querying and manipulating multidimensional data stored in OLAP cubes. As such, an MDX engine 810 may be provided to allow for the parsing and executing of MDX commands. A planning engine 812 allows applications to execute basic planning operations in the database layer. One such operation is to create a new version of a dataset as a copy of an existing dataset, while applying filters and transformations.

A calculation engine 814 implements the various SQL script and planning operations. The calculation engine 814 creates a logical execution plan for calculation models derived from SQL script, MDX, planning, and domain-specific models. This logical execution plan may include, for example, breaking up a model into operations that can be processed in parallel. The data is stored in relational stores 816, which implement a relational database in main memory. Each SQL statement may be processed in the context of a transaction. New sessions are implicitly assigned to a new transaction. A transaction manager 818 coordinates database transactions, controls transactional isolation, and keeps track of running and closed transactions. When a transaction is committed or rolled back, the transaction manager 818 informs the involved engines about this event so they can execute needed actions. The transaction manager 818 also cooperates with a persistence layer 820 to achieve atomic and durable transactions.

An authorization manager 822 is invoked by other database system components to check whether the user has the specified privileges to execute the requested operations. The database management system 700 allows for the granting of privileges to users or roles. A privilege grants the right to perform a specified operation on a specified object.

The persistence layer 820 ensures that the database is restored to the most recent committed state after a restart and that transactions are either completely executed or completely undone. To achieve this goal in an efficient way, the persistence layer 820 uses a combination of write-ahead logs, shadow paging, and save points. The persistence layer 820 also offers a page management interface 824 for writing and reading data to a separate disk storage 826, and also contains a logger 828 that manages the transaction log. Log entries can be written implicitly by the persistence layer 820 when data is written via the persistence interface or explicitly by using a log interface.

Figure 9:
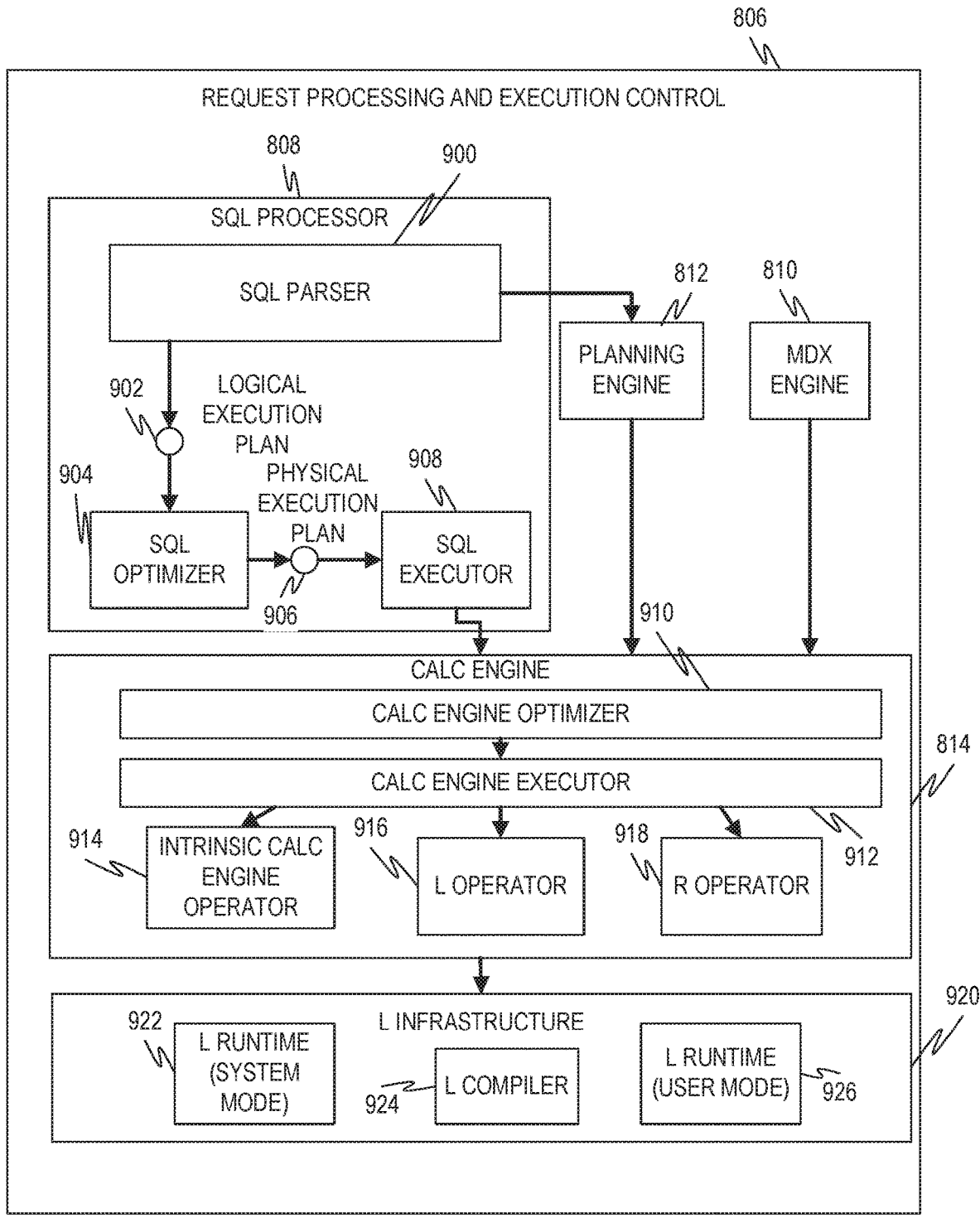
FIG. 9 is a diagram illustrating one example of the request processing and execution control of FIG. 8.

FIG. 9 is a diagram illustrating one example of the request processing and execution control 806. This diagram depicts the request processing and execution control 806 of FIG. 8 in more detail. The SQL processor 808 contains an SQL parser 900, which parses the SQL statement and generates a logical execution plan 902, which it passes to an SQL optimizer 904. The SQL optimizer 904 optimizes the logical execution plan 902 and converts it to a physical execution plan 906, which it then passes to a SQL executor 908. The calculation engine 814 implements the various SQL script and planning operations, and includes a calc engine optimizer 910, which optimizes the operations, and a calc engine executor 912, which executes the operations, as well as an intrinsic calc engine operator 914, an L operator 916, and an R operator 918.

An L infrastructure 920 includes a number of components to aid in the running of L procedures, including an L-runtime (system mode) 922, an L compiler 924, and an L-runtime (user mode) 926.

Figure 10:
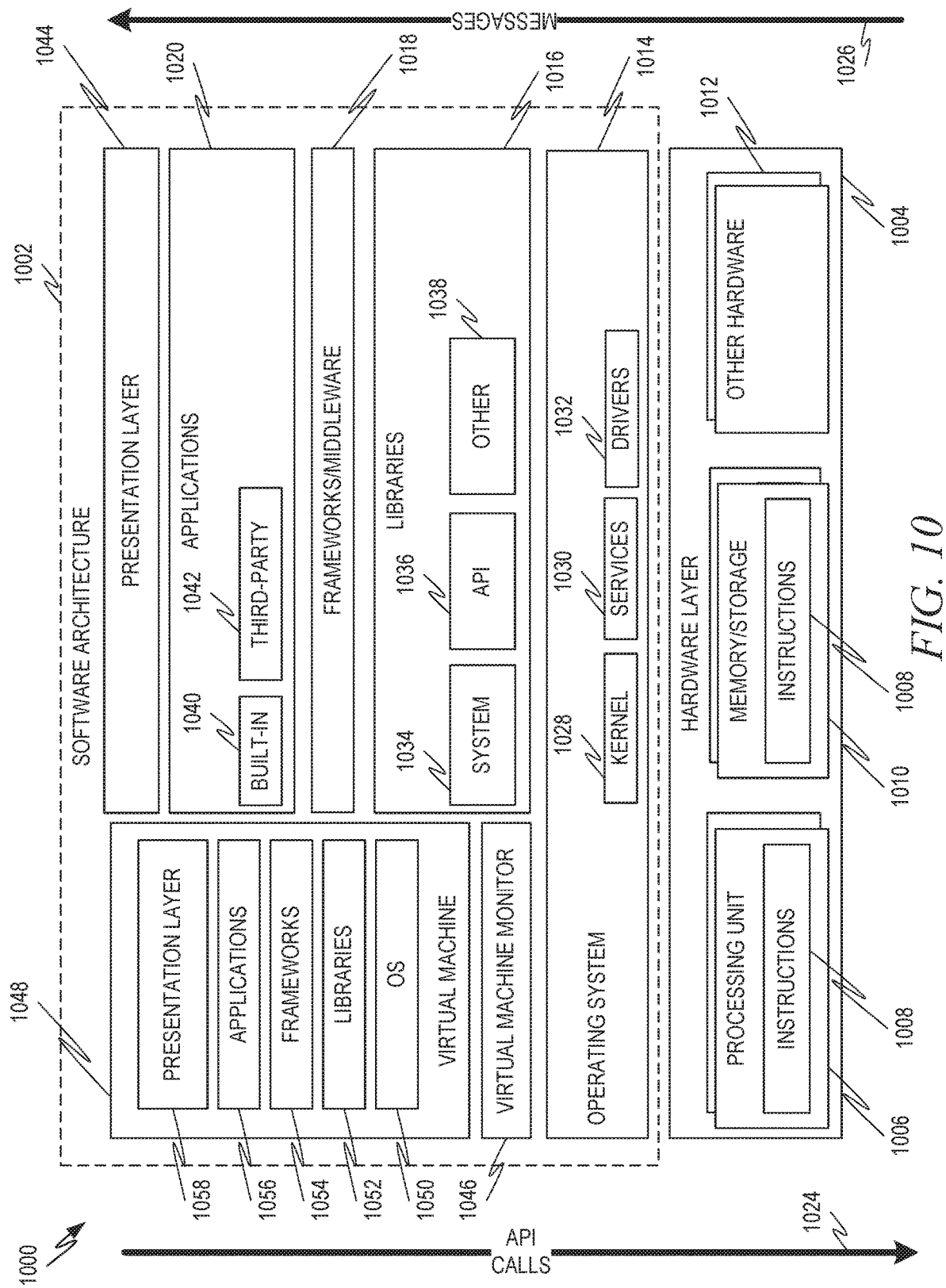
FIG. 10 is a block diagram showing one example of a software architecture for a computing device.

FIG. 10 is a block diagram 1000 showing one example of a software architecture 1002 for a computing device. The architecture 1002 may be used in conjunction with various hardware architectures, for example, as described herein. FIG. 10 is merely a non-limiting example of a software architecture and many other architectures may be implemented to facilitate the functionality described herein. A representative hardware layer 1004 is illustrated and can represent, for example, any of the above referenced computing devices. In some examples, the hardware layer 1004 may be implemented according to the architecture of the computer system 1100 of FIG. 11.

The representative hardware layer 1004 comprises one or more processing units 1006 having associated executable instructions 1008. Executable instructions 1008 represent the executable instructions of the software architecture 1002, including implementation of the methods, modules, subsystems, and components, and so forth described herein and may also include memory and/or storage modules 1010, which also have executable instructions 1008. Hardware layer 1004 may also comprise other hardware as indicated by other hardware 1012, which represents any other hardware of the hardware layer 1004, such as the other hardware illustrated as part of computer system 1100.

In the example architecture of FIG. 10, the software architecture 1002 may be conceptualized as a stack of layers where each layer provides particular functionality. For example, the software architecture 1002 may include layers such as an operating system 1014, libraries 1016, frameworks/middleware 1018, applications 1020 and presentation layer 1044. Operationally, the applications 1020 and/or other components within the layers may invoke application programming interface (API) calls 1024 through the software stack and access a response, returned values, and so forth illustrated as messages 1026 in response to the API calls 1024. The layers illustrated are representative in nature and not all software architectures have all layers. For example, some mobile or special purpose operating systems may not provide a frameworks/middleware layer 1018, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. In some examples, the services 1030 include an interrupt service. The interrupt service may detect the receipt of an interrupt and, in response, cause the architecture 1002 to pause its current processing and execute an interrupt service routine (ISR) when an interrupt is accessed.

The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1016 may provide a common infrastructure that may be utilized by the applications 1020 and/or other components and/or layers. The libraries 1016 typically provide functionality that allows other software modules to perform tasks in an easier fashion than to interface directly with the underlying operating system 1014 functionality (e.g., kernel 1028, services 1030 and/or drivers 1032). The libraries 1016 may include system libraries 1034 (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 8D in a graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules. In some examples, libraries 1016 may provide one or more APIs serviced by a message oriented middleware.

The frameworks 1018 (also sometimes referred to as middleware) may provide a higher-level common infrastructure that may be utilized by the applications 1020 and/or other software components/modules. For example, the frameworks 1018 may provide various graphic user interface (GUI) functions, high-level resource management, high-level location services, and so forth. The frameworks 1018 may provide a broad spectrum of other APIs that may be utilized by the applications 1020 and/or other software components/modules, some of which may be specific to a particular operating system or platform.

The applications 1020 include built-in applications 1040 and/or third-party applications 1042. Examples of representative built-in applications 1040 may include, but are not limited to, a contacts application, a browser application, a book reader application, a location application, a media application, a messaging application, and/or a game application. Third-party applications 1042 may include any of the built-in applications 1040 as well as a broad assortment of other applications. In a specific example, the third-party application 1042 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1042 may invoke the API calls 1024 provided by the mobile operating system such as operating system 1014 to facilitate functionality described herein.

The applications 1020 may utilize built-in operating system functions (e.g., kernel 1028, services 1030 and/or drivers 1032), libraries (e.g., system 1034, APIs 1036, and other libraries 1038), frameworks/middleware 1018 to create user interfaces to interact with users of the system. Alternatively, or additionally, in some systems interactions with a user may occur through a presentation layer, such as presentation layer 1044. In these systems, the application/module "logic" can be separated from the aspects of the application/module that interact with a user.

Some software architectures utilize virtual machines. In the example of FIG. 10, this is illustrated by virtual machine 1048. A virtual machine creates a software environment where applications/modules can execute as if they were executing on a hardware computing device. A virtual machine 1048 is hosted by a host operating system (operating system 1014) and typically, although not always, has a virtual machine monitor 1046, which manages the operation of the virtual machine 1048 as well as the interface with the host operating system (i.e., operating system 1014). A software architecture executes within the virtual machine 1048 such as an operating system 1050, libraries 1052, frameworks/middleware 1054, applications 1056 and/or presentation layer 1058. These layers of software architecture executing within the virtual machine 1048 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 11:
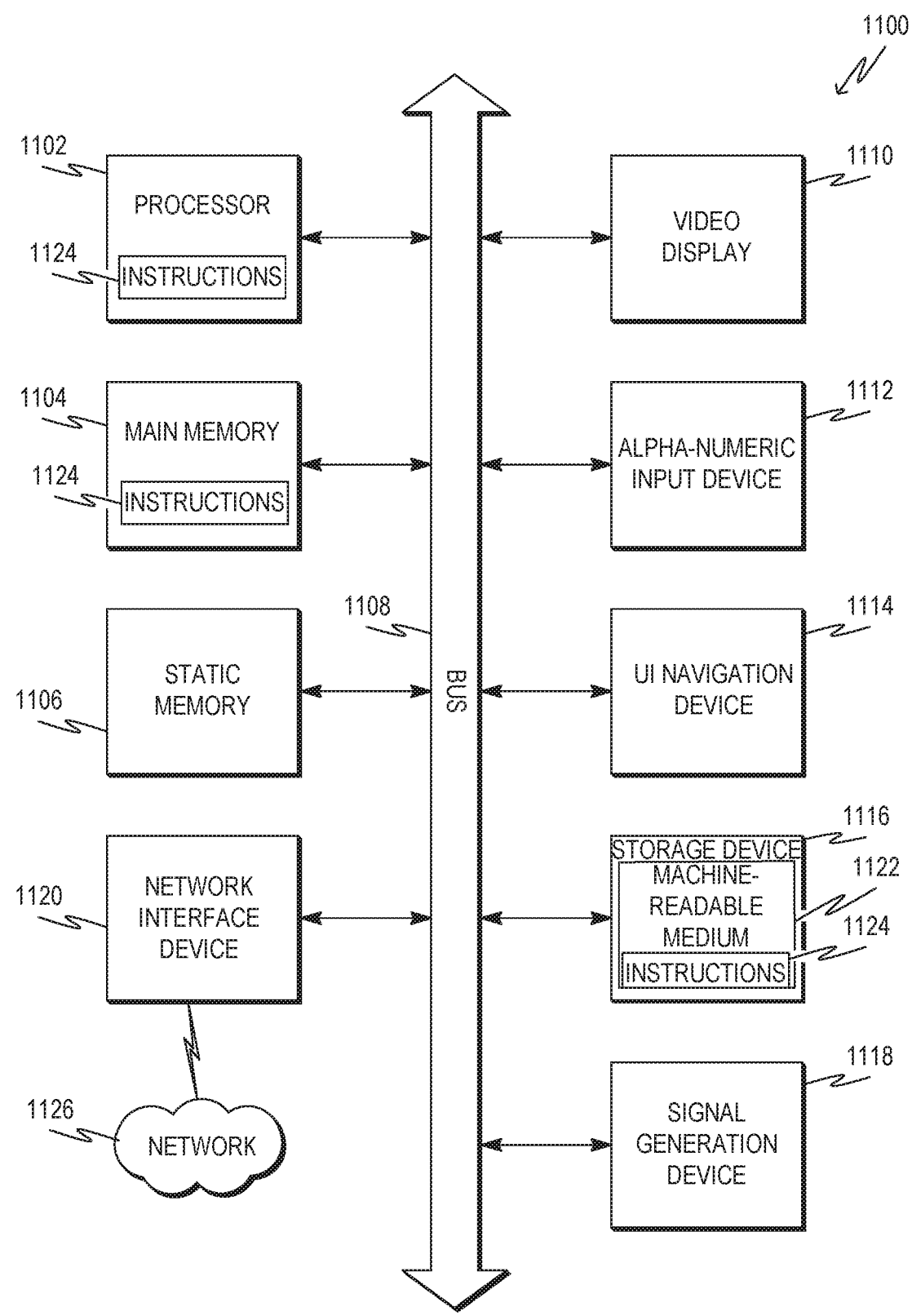
FIG. 11 is a block diagram of a machine in the example form of a computer system within which instructions may be executed for causing the machine to perform any one or more of the methodologies discussed herein.

FIG. 11 is a block diagram of a machine in the example form of a computer system 1100 within which instructions 1124 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104, and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard or a touch-sensitive display screen), a user interface (UI) navigation (or cursor control) device 1114 (e.g., a mouse), a disk drive device 1116, a signal generation device 1118 (e.g., a speaker), and a network interface device 1120.

Machine-Readable Medium

The disk drive unit 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 and/or within the processor 1102 during execution thereof by the computer system 1100, with the main memory 1104 and the processor 1102 also constituting machine-readable media 1122.

While the machine-readable medium 1122 is shown in an example embodiment to be a single medium, the term "machine-readable medium" may include a single medium or multiple media (e.g., a centralized or distributed database, and/or associated caches and servers) that store the one or more instructions 1124 or data structures. The term "machine-readable medium" shall also be taken to include any tangible medium that is capable of storing, encoding, or carrying instructions 1124 for execution by the machine and that cause the machine to perform any one or more of the methodologies of the present disclosure, or that is capable of storing, encoding, or carrying data structures utilized by or associated with such instructions 1124. The term "machine-readable medium" shall accordingly be taken to include, but not be limited to, solid-state memories, and optical and magnetic media. Specific examples of machine-readable media 1122 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1124 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

EXAMPLES

Example 1 is a computing device for executing a web application, the computing device comprising a processor that is programmed to perform operations comprising: receiving, by a web browser application executed by the processor, web application code for executing the web application; receiving, by the web browser application, service worker code for executing a service worker; executing, by the processor, a first portion of the web application code to register the service worker; executing, by the processor, the service worker; sending, by the web application, a first communication request describing a first recipient computing device; determining, by the service worker, that the first communication request complies with a set of filter rules; and sending, by the service worker, the first communication request to the first recipient computing device.

In Example 2, the subject matter of Example 1 optionally includes wherein the processor is further programmed to perform operations comprising overwriting, by the web application, a controller variable that references the service worker from the web application.

In Example 3, the subject matter of any one or more of Examples 1-2 optionally includes wherein the processor is further programmed to perform operations comprising: sending, by the web application, a second communication request describing a second recipient computing device; receiving, by the service worker, the second communication request; determining, by the service worker, that the second communication request does not comply with the set of filter rules; and rejecting the second communication request.

In Example 4, the subject matter of any one or more of Examples 1-3 optionally includes wherein determining that the first communication request complies with the set of filter rules comprises determining that the first recipient computing device is described by white list data indicating a set of computing devices with which the web application is authorized to communicate.

In Example 5, the subject matter of any one or more of Examples 1-4 optionally includes wherein determining that the first communication request complies with the set of filter rules comprises determining that the first recipient computing device is not described by black list data indicating a set of computing devices with which the web application is not authorized to communicate.

In Example 6, the subject matter of any one or more of Examples 1-5 optionally includes wherein determining that the first communication request complies with the set of filter rules is based at least in part on a position of the first communication request in a sequence of communication requests.

In Example 7, the subject matter of any one or more of Examples 1-6 optionally includes wherein determining that the first communication request complies with the set of filter rules comprises determining a number of communication requests that the web application has sent to the first recipient computing device before sending the first communication request.

In Example 8, the subject matter of any one or more of Examples 1-7 optionally includes wherein the web application code comprises the first portion, a second portion executable to load a set of external libraries, and a third portion executable to load at least a portion of a web application user interface (UI), and where the executing of the first portion of the web application code is before the second portion is executed and before the third portion is executed.

In Example 9, the subject matter of any one or more of Examples 1-8 optionally includes wherein the processor is further programmed to perform operations comprising before sending the first communication request to the first recipient computing device, determining that first content described by the first recipient computing device is not cached.

Example 10 is a method for executing a web application, the method comprising: receiving, by a web browser application executed by a processor, web application code for executing the web application; receiving, by the web browser application, service worker code for executing a service worker; executing, by the processor, a first portion of the web application code, to register the service worker; executing, by the processor, the service worker; sending, by the web application, a first communication request describing a first recipient computing device; determining, by the service worker, that the first communication request complies with a set of filter rules; and sending, by the service worker, the first communication request to the first recipient computing device.

In Example 11, the subject matter of Example 10 optionally includes overwriting, by the web application, a controller variable that references the service worker from the web application.

In Example 12, the subject matter of any one or more of Examples 10-11 optionally includes sending, by the web application, a second communication request describing a second recipient computing device; receiving, by the service worker, the second communication request; determining, by the service worker, that the second communication request does not comply with the set of filter rules; and rejecting the second communication request.

In Example 13, the subject matter of any one or more of Examples 10-12 optionally includes wherein determining that the first communication request complies with the set of filter rules comprises determining that the first recipient computing device is described by white list data indicating a set of computing devices with which the web application is authorized to communicate.

In Example 14, the subject matter of any one or more of Examples 10-13 optionally includes wherein determining that the first communication request complies with the set of filter rules comprises determining that the first recipient computing device is not described by black list data indicating a set of computing devices with which the web application is not authorized to communicate.

In Example 15, the subject matter of any one or more of Examples 10-14 optionally includes wherein determining that the first communication request complies with the set of filter rules is based at least in part on a position of the first communication request in a sequence of communication requests.

In Example 16, the subject matter of any one or more of Examples 10-15 optionally includes wherein determining that the first communication request complies with the set of filter rules comprises determining a number of communication requests that the web application has sent to the first recipient computing device before sending the first communication request.

In Example 17, the subject matter of any one or more of Examples 10-16 optionally includes wherein the web application code comprises the first portion, a second portion executable to load a set of external libraries, and a third portion executable to load at least a portion of a web application user interface (UI), and where the executing of the first portion of the web application code is before the second portion is executed and before the third portion is executed.

In Example 18, the subject matter of any one or more of Examples 10-17 optionally includes before sending the first communication request to the first recipient computing device, determining that first content described by the first recipient computing device is not cached.

Example 19 is a machine-readable medium comprising instructions thereon that, when executed by a processor, cause the processor to perform operations comprising: receiving, by a web browser application, web application code for executing a web application; receiving, by the web browser application, service worker code for executing a service worker; executing, a first portion of the web application code, to register the service worker; executing the service worker; sending, by the web application, a first communication request describing a first recipient computing device; determining, by the service worker, that the first communication request complies with set of filter rules; and sending, by the service worker, the first communication request to the first recipient computing device.

In Example 20, the subject matter of Example 19 optionally includes instructions thereon that, when executed by the processor, cause the processor to execute instructions comprising overwriting, by the web application, a controller variable that references the service worker from the web application.

What is claimed is:

1. A computing device for executing a web application, the computing device comprising a processor that is programmed to perform operations comprising:
    receiving, by a web browser application executed by the processor, web application code for executing the web application;
    receiving, by the web browser application, service worker code for executing a service worker;
    executing, by the processor, the service worker code;
    sending, by the web application, a communication request describing a recipient computing device;
    determining a threshold as a number of libraries used by the web application;
    comparing, to the determined threshold, a number of communication requests that the web application has sent to the recipient computing device before sending the communication request;
    determining, by the service worker and based on the number of communication requests, that the communication request complies with a set of filter rules; and
    sending, by the service worker, the communication request to the recipient computing device based on the determination that the communication request complies with the set of filter rules.

2. The computing device of claim 1, wherein the processor is further programmed to perform operations comprising overwriting, by the web application, a controller variable that references the service worker from the web application.

3. The computing device of claim 1, wherein the processor is further programmed to perform operations comprising:
    sending, by the web application, a second communication request describing a second recipient computing device;
    receiving, by the service worker, the second communication request;
    determining, by the service worker, that the second communication request does not comply with the set of filter rules; and
    rejecting the second communication request.

4. The computing device of claim 1, wherein the determining that the communication request complies with the set of filter rules comprises determining that the recipient computing device is described by white list data indicating a set of computing devices with which the web application is authorized to communicate.

5. The computing device of claim 1, wherein the determining that the communication request complies with the set of filter rules comprises determining that the recipient computing device is not described by black list data indicating a set of computing devices with which the web application is not authorized to communicate.

6. The computing device of claim 1, wherein the determining that the communication request complies with the set of filter rules is based at least in part on a position of the communication request in a sequence of communication requests.

7. The computing device of claim 1, wherein:
    the web application code comprises a first portion to register the service worker, a second portion executable to load a set of external libraries, and a third portion executable to load at least a portion of a web application user interface (UI); and
    the first portion of the web application code is executed before the second portion is executed and before the third portion is executed.

8. The computing device of claim 1, wherein the processor is further programmed to perform operations comprising before sending the communication request to the recipient computing device, determining that content described by the recipient computing device is not cached.

9. The computing device of claim 1, wherein the determining that the communication request complies with the set of filter rules comprises:
    accessing library dependency data; and
    applying a sequential filter rule that blocks attempts to request library data in an order that does not conform to the library dependency data.

10. A method for executing a web application, the method comprising:
    receiving, by a web browser application executed by a processor, web application code for executing the web application;

receiving, by the web browser application, service worker code for executing a service worker;

executing, by the processor, the service worker code;

sending, by the web application, a communication request describing a recipient computing device;

determining a threshold as a number of libraries used by the web application;

comparing, to the determined threshold, a number of communication requests that the web application has sent to the recipient computing device before sending the communication request;

determining, by the service worker and based on the number of communication requests, that the communication request complies with a set of filter rules; and sending, by the service worker, the communication request to the recipient computing device based on the determination that the communication request complies with the set of filter rules.

11. The method of claim 10, further comprising overwriting, by the web application, a controller variable that references the service worker from the web application.

12. The method of claim 10, further comprising:

sending, by the web application, a second communication request describing a second recipient computing device;

receiving, by the service worker, the second communication request;

determining, by the service worker, that the second communication request does not comply with the set of filter rules; and rejecting the second communication request.

13. The method of claim 10, wherein determining that the communication request complies with the set of filter rules comprises determining that the recipient computing device is described by white list data indicating a set of computing devices with which the web application is authorized to communicate.

14. The method of claim 10, wherein determining that the communication request complies with the set of filter rules comprises determining that the recipient computing device is not described by black list data indicating a set of computing devices with which the web application is not authorized to communicate.

15. The method of claim 10, wherein determining that the communication request complies with the set of filter rules is based at least in part on a position of the communication request in a sequence of communication requests.

16. The method of claim 10, wherein:

the web application code comprises a first portion to register the service worker, a second portion executable to load a set of external libraries, and a third portion executable to load at least a portion of a web application user interface (UI); and the first portion of the web application code is executed before the second portion is executed and before the third portion is executed.

17. The method of claim 10, further comprising before sending the communication request to the recipient computing device, determining that content described by the recipient computing device is not cached.

18. A non-transitory machine-readable medium comprising instructions thereon that, when executed by a processor, cause the processor to perform operations comprising:

receiving, by a web browser application, web application code for executing a web application;

receiving, by the web browser application, service worker code for executing a service worker;

executing the service worker code;

sending, by the web application, a communication request describing a recipient computing device;

determining a threshold as a number of libraries used by the web application;

comparing, to the determined threshold, a number of communication requests that the web application has sent to the recipient computing device before sending the communication request;

determining, by the service worker and based on the number of communication requests, that the communication request complies with a set of filter rules; and sending, by the service worker, the communication request to the recipient computing device based on the determination that the communication request complies with the set of filter rules.

19. The non-transitory machine-readable medium of claim 18, further comprising instructions thereon that, when executed by the processor, cause the processor to execute instructions comprising overwriting, by the web application, a controller variable that references the service worker from the web application.

20. The non-transitory machine-readable medium of claim 18, further comprising instructions thereon that, when executed by the processor, cause the processor to execute instructions comprising:

sending, by the web application, a second communication request describing a second recipient computing device;

receiving, by the service worker, the second communication request;

determining, by the service worker, that the second communication request does not comply with the set of filter rules; and rejecting the second communication request.

\* \* \* \* \*